United States Patent
Lee et al.

(10) Patent No.: US 9,712,303 B2
(45) Date of Patent: Jul. 18, 2017

(54) GROUPING BASED REFERENCE SIGNAL TRANSMISSION FOR MASSIVE MIMO SCHEME

(71) Applicant: LG ELECTRONICS INC., Seoul (KR)

(72) Inventors: Kilbom Lee, Seoul (KR); Jiwon Kang, Seoul (KR); Hyunsoo Ko, Seoul (KR); Jaehoon Chung, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 14/891,927

(22) PCT Filed: Feb. 21, 2014

(86) PCT No.: PCT/KR2014/001424
§ 371 (c)(1),
(2) Date: Nov. 17, 2015

(87) PCT Pub. No.: WO2014/208859
PCT Pub. Date: Dec. 31, 2014

(65) Prior Publication Data
US 2016/0094324 A1    Mar. 31, 2016

Related U.S. Application Data

(60) Provisional application No. 61/839,830, filed on Jun. 26, 2013.

(51) Int. Cl.
*H04L 5/00* (2006.01)
*H04B 7/0413* (2017.01)
(Continued)

(52) U.S. Cl.
CPC ......... *H04L 5/0048* (2013.01); *H04B 7/0413* (2013.01); *H04L 5/0037* (2013.01);
(Continued)

(58) Field of Classification Search
CPC . H04L 5/0048; H04L 5/0035; H04L 67/1044; H04L 5/0007; H04B 7/0413; H04W 72/0413
See application file for complete search history.

(56) References Cited

U.S. PATENT DOCUMENTS 8,531,939 B2 * 9/2013 Yoon .............. H04L 5/0023
                                                                370/203
2011/0206089 A1   8/2011 Cho et al.
(Continued)

FOREIGN PATENT DOCUMENTS

EP          2584850 A1     4/2013
EP          2876952 A1     5/2015
(Continued)

OTHER PUBLICATIONS

ZTE, "Discussion on scenarios of 3D beamforming and Massive MIMO," 3GPP TSG RAN WG1 Meeting #72, R1-130140, St Julian's, Malta, Jan. 28-Feb. 1, 2013, 3 pages.

*Primary Examiner* — Janice Tieu
(74) *Attorney, Agent, or Firm* — Birch, Stewart, Kolasch & Birch, LLP

(57) ABSTRACT

A reference signal transmission scheme is presented. A first user equipment (UE) receives first information identifying which uplink subframe of a plurality of subframes is enabled to transmit an uplink reference signal, and receives second information identifying a sequence used for the uplink reference signal from a base station. The first information is used to identify a different uplink subframe to a first UE group including the first UE and a second UE group other than the first UE group. The second information is determined to assign different orthogonal sequences to each of UEs of the first UE group. The first UE transmits the uplink reference signal to the base station at the uplink subframe
(Continued)

identified by the first information using the sequence identified by the second information.

14 Claims, 11 Drawing Sheets

(51) Int. Cl.
    *H04L 29/08*     (2006.01)
    *H04W 72/04*     (2009.01)

(52) U.S. Cl.
    CPC ........ *H04L 5/0051* (2013.01); *H04L 67/1044* (2013.01); *H04W 72/0413* (2013.01); *H04L 5/0023* (2013.01); *H04L 5/0091* (2013.01)

(56) References Cited

U.S. PATENT DOCUMENTS

| | | |
|---|---|---|
| 2011/0237267 A1 | 9/2011 | Chen et al. |
| 2011/0243262 A1 | 10/2011 | Ratasuk et al. |
| 2011/0267972 A1 | 11/2011 | Yoon et al. |
| 2012/0281654 A1 | 11/2012 | Aiba et al. |
| 2013/0121266 A1 | 5/2013 | Ko et al. |

FOREIGN PATENT DOCUMENTS

| | | |
|---|---|---|
| KR | 10-2013-0018073 A | 2/2013 |
| WO | WO 2013/042982 A1 | 3/2013 |

\* cited by examiner

FIG. 3
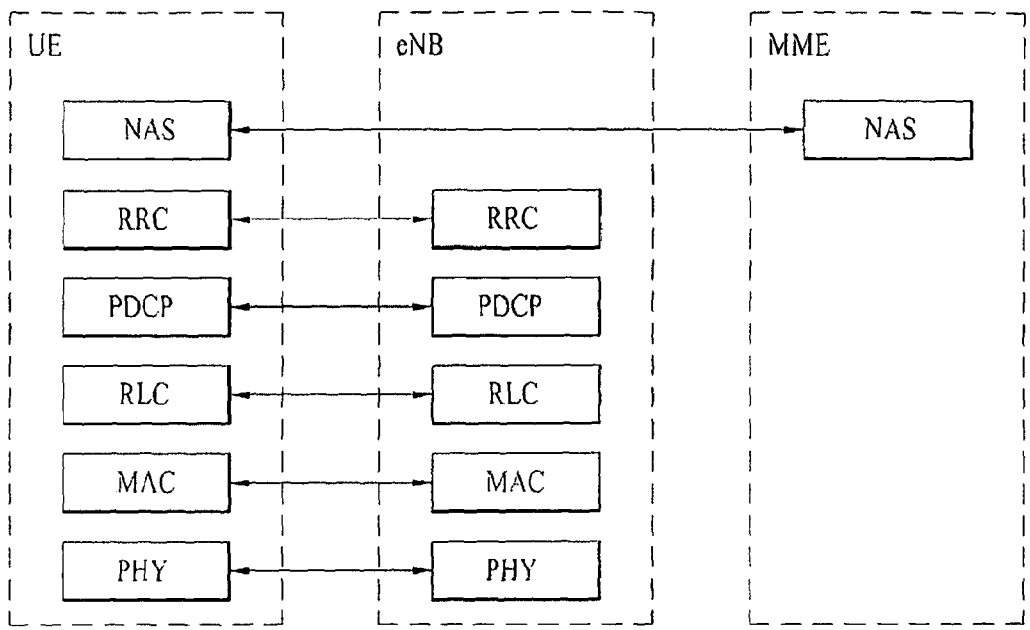
(a) contol - plane protocol stack
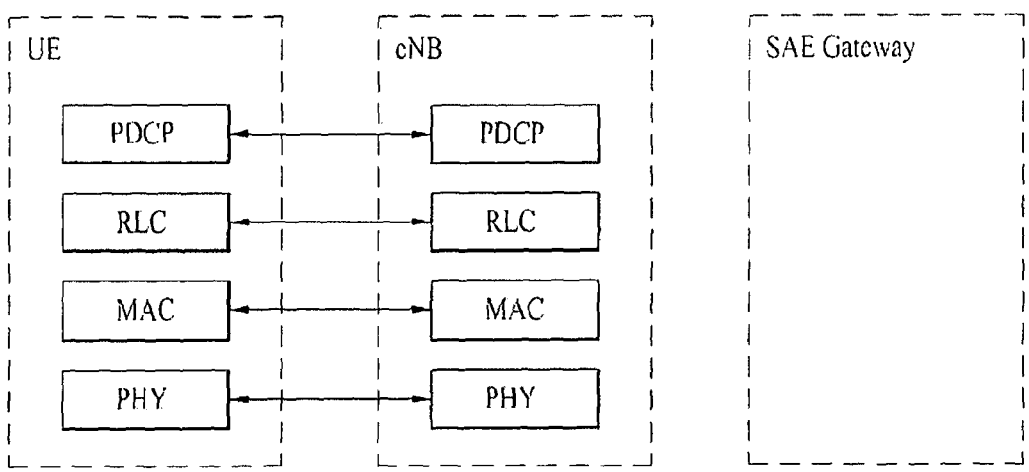
(b) user - plane protocol stack

GROUPING BASED REFERENCE SIGNAL TRANSMISSION FOR MASSIVE MIMO SCHEME

CROSS REFERENCE TO RELATED APPLICATIONS

This application is the National Phase of PCT/KR2014/001424 filed on Feb. 21, 2014, which claims priority under 35 U.S.C. 119(e) to U.S. Provisional Application No. 61/839,830 filed on Jun. 26, 2013, all of which are hereby expressly incorporated by reference into the present application.

TECHNICAL FIELD

The present invention relates to a wireless communication system, and more particularly, to methods for grouping-based reference signal transmission for massive MIMO scheme, and apparatuses for the same.

BACKGROUND ART

As an example of a wireless communication system to which the present invention is applicable, a 3rd generation partnership project (3GPP) long term evolution (LTE) communication system will be schematically described.

FIG. 1 is a schematic diagram showing a network structure of an evolved universal mobile telecommunications system (E-UMTS) as an example of a wireless communication system. The E-UMTS is an evolved form of the legacy UMTS and has been standardized in the 3GPP. In general, the E-UMTS is also called an LTE system. For details of the technical specification of the UMTS and the E-UMTS, refer to Release 7 and Release 8 of "3rd Generation Partnership Project; Technical Specification Group Radio Access Network".

Referring to FIG. 1, the E-UMTS includes a user equipment (UE), an evolved node B (eNode B or eNB), and an access gateway (AG) which is located at an end of an evolved UMTS terrestrial radio access network (E-UTRAN) and connected to an external network. The eNB may simultaneously transmit multiple data streams for a broadcast service, a multicast service and/or a unicast service.

One or more cells may exist per eNB. The cell is set to operate in one of bandwidths such as 1.25, 2.5, 5, 10, 15, and 20 MHz and provides a downlink (DL) or uplink (UL) transmission service to a plurality of UEs in the bandwidth. Different cells may be set to provide different bandwidths. The eNB controls data transmission or reception to and from a plurality of UEs. The eNB transmits DL scheduling information of DL data to a corresponding UE so as to inform the UE of a time/frequency domain in which the DL data is supposed to be transmitted, coding, a data size, and hybrid automatic repeat and request (HARQ)-related information. In addition, the eNB transmits UL scheduling information of UL data to a corresponding UE so as to inform the UE of a time/frequency domain which may be used by the UE, coding, a data size, and HARQ-related information. An interface for transmitting user traffic or control traffic may be used between eNBs. A core network (CN) may include the AG and a network node or the like for user registration of UEs. The AG manages the mobility of a UE on a tracking area (TA) basis. One TA includes a plurality of cells.

Although wireless communication technology has been developed to LTE based on wideband code division multiple access (WCDMA), the demands and expectations of users and service providers are on the rise. In addition, considering other radio access technologies under development, new technological evolution is required to secure high competitiveness in the future. Decrease in cost per bit, increase in service availability, flexible use of frequency bands, a simplified structure, an open interface, appropriate power consumption of UEs, and the like are required.

DISCLOSURE

Technical Problem

Accordingly, the present invention is directed to methods for grouping-based reference signal transmission for massive MIMO scheme, and apparatuses for the same that substantially obviates one or more problems due to limitations and disadvantages of the related art.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

Technical Solution

To achieve these objects and other advantages and in accordance with the purpose of the invention, as embodied and broadly described herein, a method for a first user equipment (UE) to operate in a wireless communication system employing a massive MIMO (Multiple Input Multiple Output) scheme, the method comprising: receiving first information on which of uplink transmission time units is enabled to transmit an uplink reference signal and second information on a sequence used for the uplink reference signal from a base station, wherein the first information is differently determined to second UE group other than a first UE group including the first UE, wherein the second information is determined to assign orthogonal sequences to the first UE group; and transmitting the uplink reference signal to a base station at an uplink transmission time unit identified by the first information using the sequence identified by the second information, is provided.

The first UE may transmit the uplink reference signal at different uplink transmission time unit other than an uplink transmission time unit in which a UE of the second UE group transmits the uplink reference signal.

The above method may further comprises receiving third information on when the first UE transmits the uplink reference signals within the uplink transmission time unit identified by the first information.

The third information may comprise a period information and an offset information, and the third information may be UE specific information.

The third information may comprise indication information explicitly indicating when the first UE transmits the uplink reference signals.

Here, the base station may comprise multiple antennas, and the number of multiple antennas is greater than a threshold number.

To achieve these objects and other advantages and in accordance with the purpose of the invention, as embodied and broadly described herein, a method for a base station to operate in a wireless communication system employing a massive MIMO (Multiple Input Multiple Output) scheme, the method comprising: transmitting first information on which of uplink transmission time units is enabled to transmit an uplink reference signal and second information on a sequence used for the uplink reference signal to user equipments (UEs), wherein the first information is differently determined to second UE group other than a first UE group, wherein the second information is determined to assign orthogonal sequences to UEs of a same UE group; receiving the uplink reference signal from the UEs at uplink transmission time units identified by the first information; and estimating a channel using the sequence identified by the second information, is provided.

The uplink reference signal from a first UE of the first UE group may be received at different uplink transmission time unit other than an uplink transmission time unit in which the uplink reference signal from a second UE of the second UE group is received.

The above method may further comprises transmitting third information on when a first UE of the first UE group transmits the uplink reference signals within the uplink transmission time unit identified by the first information.

The third information may comprise a period information and an offset information, and the third information may be UE specific information.

The third information may comprise indication information explicitly indicating when the first UE transmits the uplink reference signals.

The base station may comprise multiple antennas, wherein a number of multiple antennas is greater than a threshold number.

In another aspect of the present invention, a user equipment (UE) operating as a first UE in a wireless communication system employing a massive MIMO (Multiple Input Multiple Output) scheme, the UE comprising: a receiver configured to receive first information on which of uplink transmission time units is enabled to transmit an uplink reference signal and second information on a sequence used for the uplink reference signal from a base station, wherein the first information is differently determined to second UE group other than a first UE group including the first UE, wherein the second information is determined to assign orthogonal sequences to the first UE group; a transmitter configured to transmit the uplink reference signal to a base station at an uplink transmission time unit identified by the first information using the sequence identified by the second information; and a processor connected to the receiver and transmitter, is provided.

In still another aspect of the present invention, a base station operating in a wireless communication system employing a massive MIMO (Multiple Input Multiple Output) scheme, the base station comprising: a transmitter configured to transmit first information on which of uplink transmission time units is enabled to transmit an uplink reference signal and second information on a sequence used for the uplink reference signal to user equipments (UEs), wherein the first information is differently determined to second UE group other than a first UE group, wherein the second information is determined to assign orthogonal sequences to UEs of a same UE group; a receiver configured to receive the uplink reference signal from the UEs at uplink transmission time units identified by the first information; and a processor connected to the transmitter and the receiver, and configured to estimate a channel using the sequence identified by the second information, is provided.

Advantageous Effects

According to embodiments of the present invention, the network and the user equipment can efficiently transmit and receive signals in a wireless communication system.

It is to be understood that both the foregoing general description and the following detailed description of the present invention are exemplary and explanatory and are intended to provide further explanation of the invention as claimed.

DESCRIPTION OF DRAWINGS

The accompanying drawings, which are included to provide a further understanding of the invention and are incorporated in and constitute a part of this application, illustrate embodiment(s) of the invention and together with the description serve to explain the principle of the invention.

FIG. 3 is a diagram showing a control plane and a user plane of a radio interface protocol between a UE and an E-UTRAN based on a 3rd generation partnership project (3GPP) radio access network standard.

BEST MODE

The configuration, operation and other features of the present invention will be understood by the embodiments of the present invention described with reference to the accompanying drawings. The following embodiments are examples of applying the technical features of the present invention to a 3rd generation partnership project (3GPP) system.

Although the embodiments of the present invention are described using a long term evolution (LTE) system and a LTE-advanced (LTE-A) system in the present specification, they are purely exemplary. Therefore, the embodiments of the present invention are applicable to any other communication system corresponding to the above definition. In addition, although the embodiments of the present invention are described based on a time division duplex (TDD) scheme in the present specification, the embodiments of the present invention may be easily modified and applied to a half-duplex FDD (H-FDD) scheme or a frequency division duplex (FDD) scheme.

Figure 1:
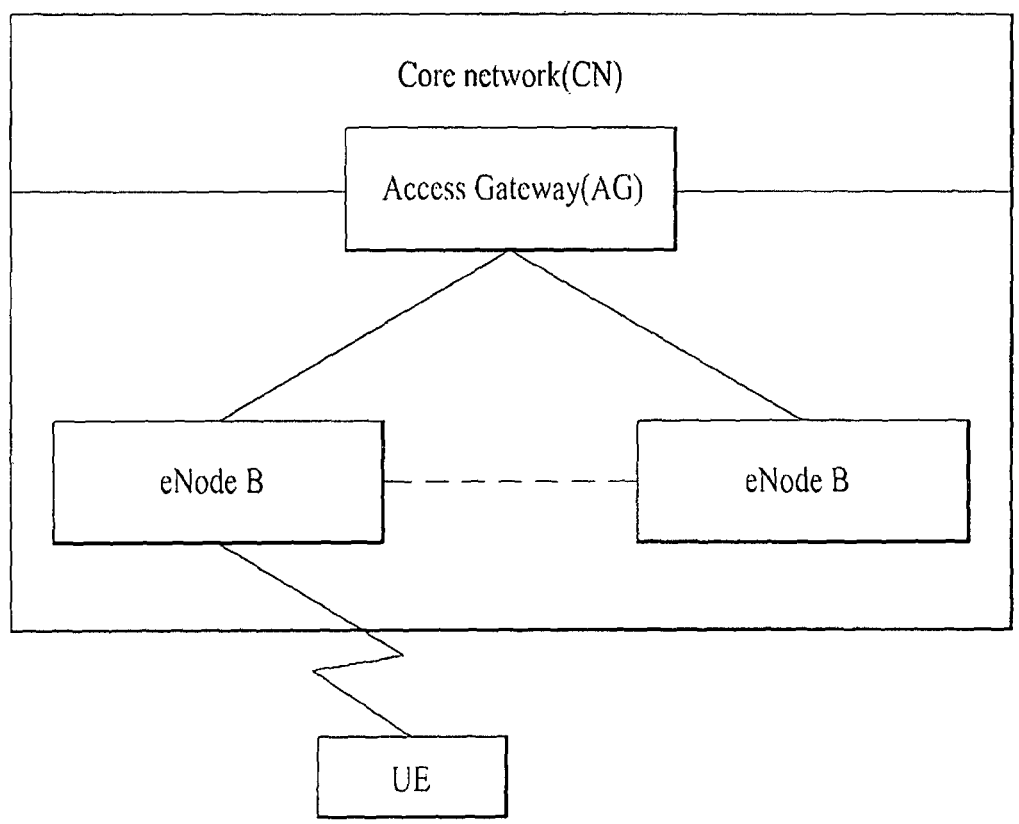
FIG. 1 is a diagram showing a network structure of an Evolved Universal Mobile Telecommunications System (E-UMTS) as an example of a wireless communication system.
Figure 2:
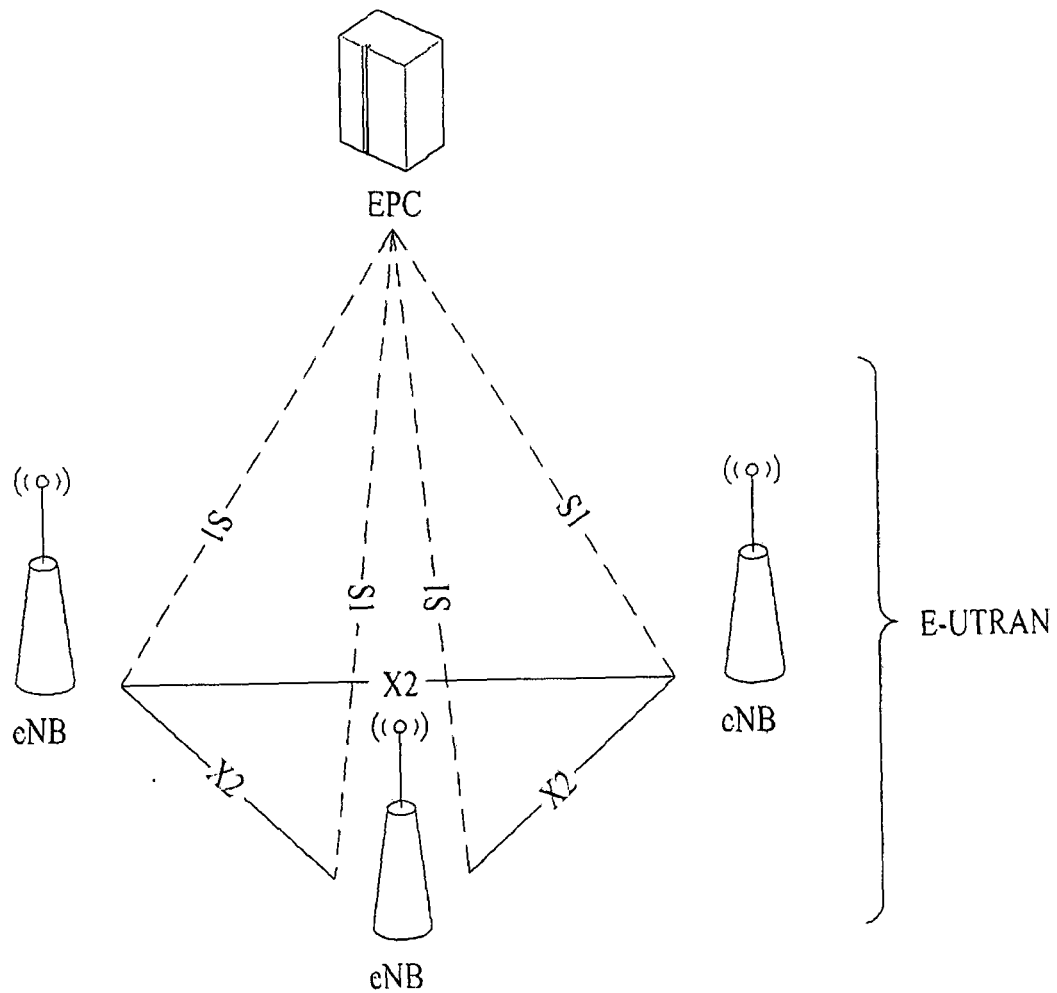
FIG. 2 is a diagram conceptually showing a network structure of an evolved universal terrestrial radio access network (E-UTRAN).

FIG. 2 is a diagram conceptually showing a network structure of an evolved universal terrestrial radio access network (E-UTRAN). An E-UTRAN system is an evolved form of a legacy UTRAN system. The E-UTRAN includes cells (eNB) which are connected to each other via an X2 interface. A cell is connected to a user equipment (UE) via a radio interface and to an evolved packet core (EPC) via an S1 interface.

The EPC includes a mobility management entity (MME), a serving-gateway (S-GW), and a packet data network-gateway (PDN-GW). The MME has information about connections and capabilities of UEs, mainly for use in managing the mobility of the UEs. The S-GW is a gateway having the E-UTRAN as an end point, and the PDN-GW is a gateway having a packet data network (PDN) as an end point.

FIG. 3 is a diagram showing a control plane and a user plane of a radio interface protocol between a UE and an E-UTRAN based on a 3GPP radio access network standard. The control plane refers to a path used for transmitting control messages used for managing a call between the UE and the E-UTRAN. The user plane refers to a path used for transmitting data generated in an application layer, e.g., voice data or Internet packet data.

A physical (PHY) layer of a first layer provides an information transfer service to a higher layer using a physical channel. The PHY layer is connected to a medium access control (MAC) layer located on the higher layer via a transport channel. Data is transported between the MAC layer and the PHY layer via the transport channel. Data is transported between a physical layer of a transmitting side and a physical layer of a receiving side via physical channels. The physical channels use time and frequency as radio resources. In detail, the physical channel is modulated using an orthogonal frequency division multiple access (OFDMA) scheme in downlink and is modulated using a single carrier frequency division multiple access (SC-FDMA) scheme in uplink.

The MAC layer of a second layer provides a service to a radio link control (RLC) layer of a higher layer via a logical channel. The RLC layer of the second layer supports reliable data transmission. A function of the RLC layer may be implemented by a functional block of the MAC layer. A packet data convergence protocol (PDCP) layer of the second layer performs a header compression function to reduce unnecessary control information for efficient transmission of an Internet protocol (IP) packet such as an IP version 4 (IPv4) packet or an IP version 6 (IPv6) packet in a radio interface having a relatively small bandwidth.

A radio resource control (RRC) layer located at the bottom of a third layer is defined only in the control plane. The RRC layer controls logical channels, transport channels, and physical channels in relation to configuration, re-configuration, and release of radio bearers (RBs). An RB refers to a service that the second layer provides for data transmission between the UE and the E-UTRAN. To this end, the RRC layer of the UE and the RRC layer of the E-UTRAN exchange RRC messages with each other.

One cell of the eNB is set to operate in one of bandwidths such as 1.25, 2.5, 5, 10, 15, and 20 MHz and provides a downlink or uplink transmission service to a plurality of UEs in the bandwidth. Different cells may be set to provide different bandwidths.

Downlink transport channels for transmission of data from the E-UTRAN to the UE include a broadcast channel (BCH) for transmission of system information, a paging channel (PCH) for transmission of paging messages, and a downlink shared channel (SCH) for transmission of user traffic or control messages. Traffic or control messages of a downlink multicast or broadcast service may be transmitted through the downlink SCH and may also be transmitted through a separate downlink multicast channel (MCH).

Uplink transport channels for transmission of data from the UE to the E-UTRAN include a random access channel (RACH) for transmission of initial control messages and an uplink SCH for transmission of user traffic or control messages. Logical channels that are defined above the transport channels and mapped to the transport channels include a broadcast control channel (BCCH), a paging control channel (PCCH), a common control channel (CCCH), a multicast control channel (MCCH), and a multicast traffic channel (MTCH).

Figure 4:
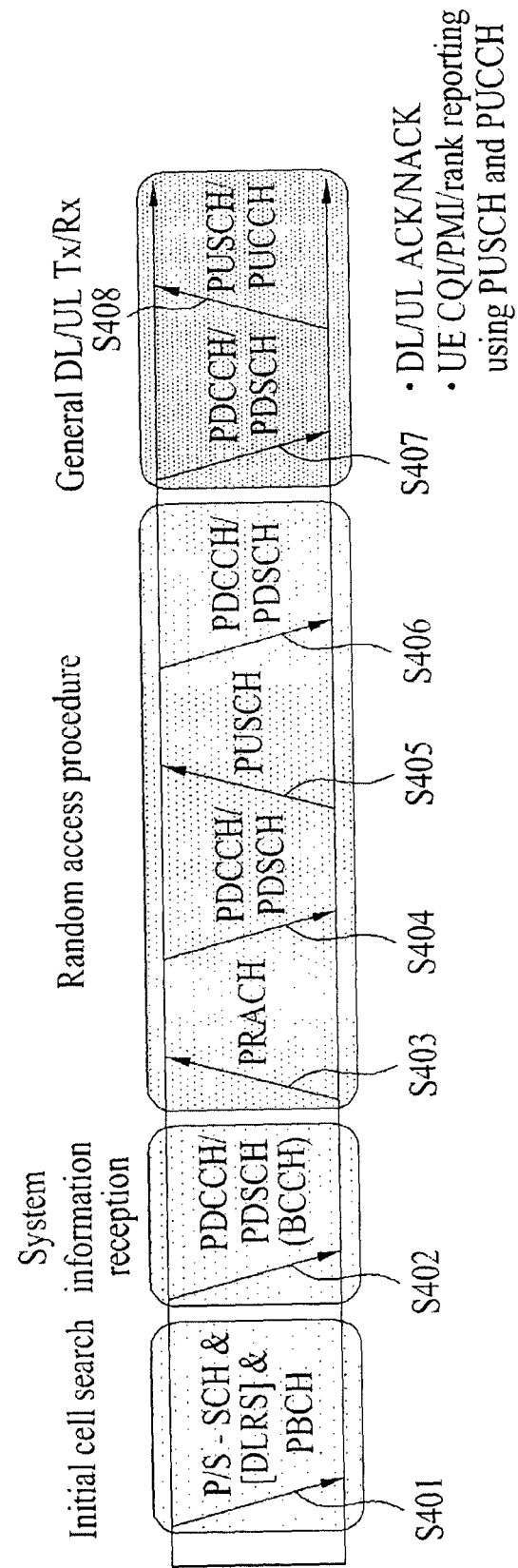
FIG. 4 is a diagram showing physical channels used in a 3GPP system and a general signal transmission method using the same.

FIG. 4 is a diagram showing physical channels used in a 3GPP system and a general signal transmission method using the same.

When a UE is powered on or enters a new cell, the UE performs an initial cell search operation such as synchronization with an eNB (S401). To this end, the UE may receive a primary synchronization channel (P-SCH) and a secondary synchronization channel (S-SCH) from the eNB to perform synchronization with the eNB and acquire information such as a cell ID. Then, the UE may receive a physical broadcast channel from the eNB to acquire broadcast information in the cell. During the initial cell search operation, the UE may receive a downlink reference signal (DL RS) so as to confirm a downlink channel state.

After the initial cell search operation, the UE may receive a physical downlink control channel (PDCCH) and a physical downlink control channel (PDSCH) based on information included in the PDCCH to acquire more detailed system information (S402).

When the UE initially accesses the eNB or has no radio resources for signal transmission, the UE may perform a random access procedure (RACH) with respect to the eNB (steps S403 to S406). To this end, the UE may transmit a specific sequence as a preamble through a physical random access channel (PRACH) (S403) and receive a response message to the preamble through the PDCCH and the PDSCH corresponding thereto (S404). In the case of contention-based RACH, the UE may further perform a contention resolution procedure.

After the above procedure, the UE may receive PDCCH/PDSCH from the eNB (S407) and may transmit a physical uplink shared channel (PUSCH)/physical uplink control channel (PUCCH) to the eNB (S408), which is a general uplink/downlink signal transmission procedure. Particularly, the UE receives downlink control information (DCI) through the PDCCH. Here, the DCI includes control information such as resource allocation information for the UE. Different DCI formats are defined according to different usages of DCI.

Control information transmitted from the UE to the eNB in uplink or transmitted from the eNB to the UE in downlink includes a downlink/uplink acknowledge/negative acknowledge (ACK/NACK) signal, a channel quality indicator (CQI), a precoding matrix index (PMI), a rank indicator (RI), and the like. In the case of the 3GPP LTE system, the UE may transmit the control information such as CQI/PMI/RI through the PUSCH and/or the PUCCH.

Figure 5:
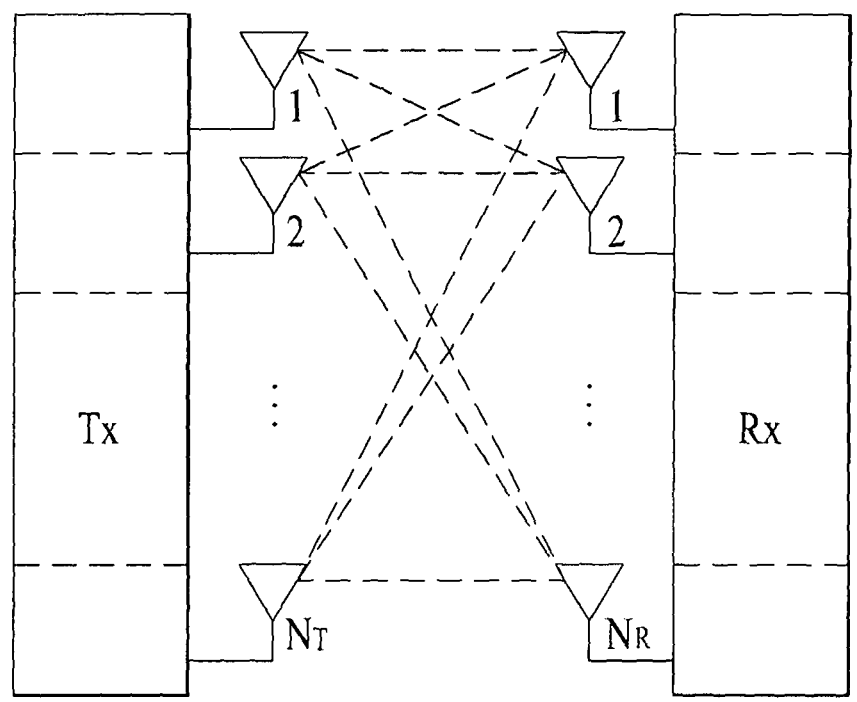
FIG. 5 is a diagram for a configuration of a general multi-antenna (MIMO) communication system.

FIG. 5 is a diagram for a configuration of a general multi-antenna (MIMO) communication system.

$N_T$ transmitting antennas are provided to a transmitting stage, while $N_R$ receiving antennas are provided to a receiving stage. In case that each of the transmitting and receiving stages uses a plurality of antennas, theoretical channel transmission capacity is increased more than that of a case that either the transmitting stage or the receiving stage uses a plurality of antennas. The increase of the channel transmission capacity is in proportion to the number of antennas. Hence, a transmission rate is enhanced and frequency efficiency can be raised. Assuming that a maximum transmission rate in case of using a single antenna is set to $R_0$, the transmission rate in case of using multiple antennas may be theoretically raised by a result from multiplying the maximum transmission rate $R_0$ by a rate increasing rate $R_i$, as shown in equation 1. In this case, $R_i$ is a smaller one of $N_T$ and $N_R$.

$$R_i = \min(N_T, N_R) \qquad \text{[Equation 1]}$$

For instance, in an MIMO communication system, which uses 4 transmitting antennas and 4 receiving antennas, it may be able to obtain a transmission rate 4 times higher than that of a single antenna system.

The above explained MIMO system assumes that the transmitter in a wireless communication system knows the channel. For some transmission schemes (e.g. STC, alamouti method), there is no need to know the channel, but it cannot be generalized. Thus, there is need for channel estimation for MIMO, so the receiver/transmitter may transmit reference signals (RSs) for this purpose.

For channel estimation without interference, the RSs of multiple transmitters should be orthogonal to each other. If there is a correlation between the RS from the first transmitter to the first receiver and the RS from the second transmitter to the second receiver, the channel estimation at the first receiver may reflect not only the channel from the first transmitter to the first receiver but also the channel from the second transmitter to the first receiver. It can be said that the channel from the first transmitter to the first receiver is contaminated by the channel from the second transmitter to the first receiver. And, this can be also said as 'pilot contamination'.

The above explained pilot contamination may limits the link performance due to the error caused by this contamination, so even when the transmitter raise the transmission power, the link performance cannot be improved above a certain limit. So, the reference signals transmitted at certain timing should be orthogonal to each other.

Based on this, the concept of massive MIMO system of the present application will be explained.

Recently, the massive MIMO scheme got lots of attention as a candidate constituent technology for 5G mobile communication system. This massive MIMO scheme can be employed to the system including a base station having multiple antennas and UEs having one antenna. Even though each UE has only one antenna, the entire system can be viewed as MIMO system when multiple UEs served by the base station having multiple antennas. If we assume that the number of UEs is K, the gradation of capacity in high SNR may be expressed as $\min(N_t, K)$.

The number of antennas for the base station can be unlimited. But, practically, we can suppose that the number of antennas of a base station exceed a certain threshold number, in order to distinguish the massive MIMO scheme from the conventional MIMO scheme. This threshold value can be 4 or 8, for example, but we suppose the case when the number of antenna for one base station is much more than this exemplary threshold number.

Theoretically, when the number of antennas for one base station goes to infinite, the optimal transmission algorism of the base station may be MRT (maximal ration transmission), and optimal reception algorithm may be MRC (maximal ration combining). These MRT and MRC are simple, but the performance of these schemes is limited when the conventional MIMO scheme is used, because these schemes do not consider the interference. However, when the number of antennas for one base station goes to infinite, the above drawback is addressed. Also, if the number of antennas increases, the beam from one antenna can be sharp, so the signal from that antenna can be carried to the received without giving interference to other receivers.

On the other hand, in order to efficiently employ the above mentioned massive MIMO scheme, the preferred embodiment of the present application assumes the use of TDD (Time Division Duplex) instead of FDD (Frequency Division Duplex).

Figure 6:
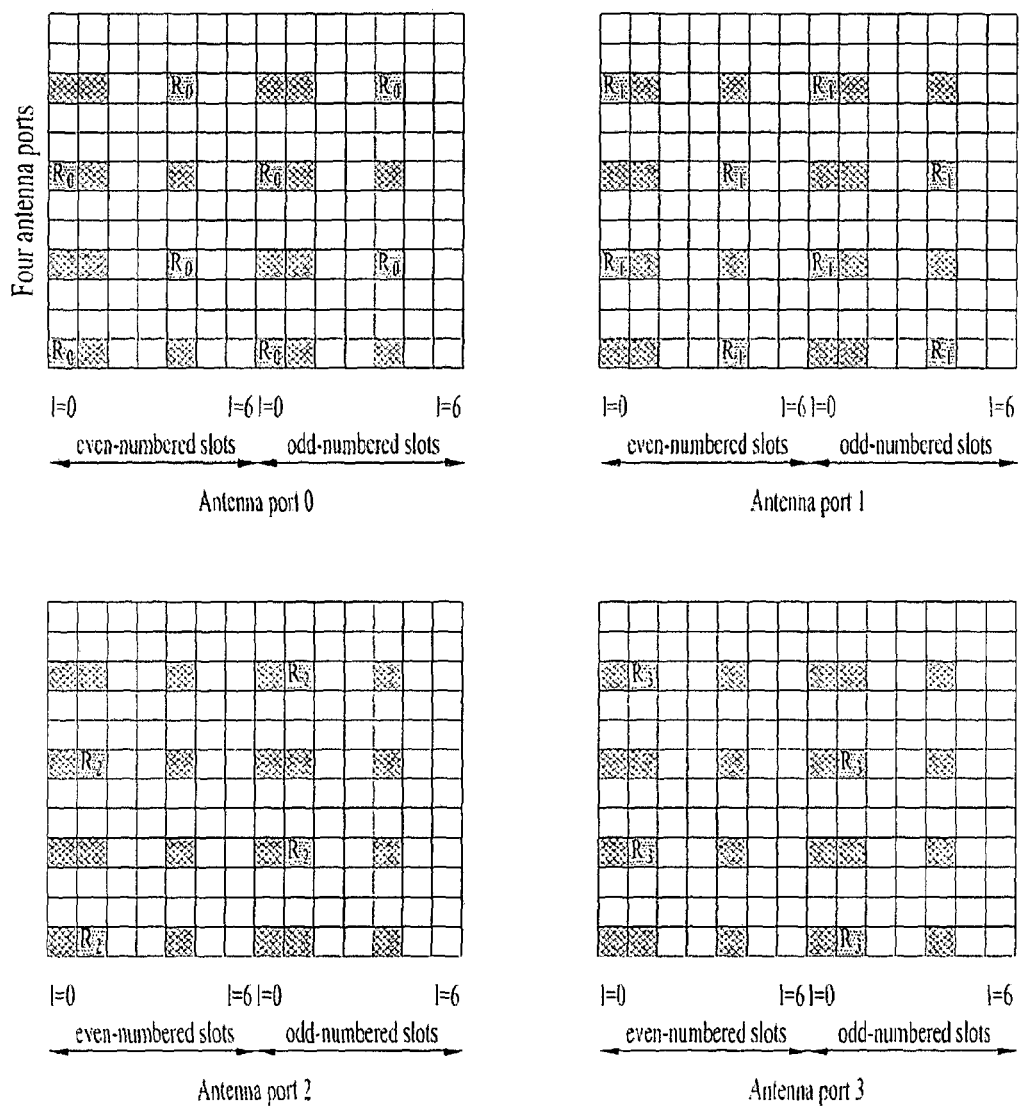
FIG. 6 shows a case when the base station having 4 antennas transmits cell-specific reference signal for channel estimation.

FIG. 6 shows a case when the base station having 4 antennas transmits cell-specific reference signal for channel estimation.

In order to perform downlink channel estimation in a wireless communication system employing FDD scheme, the base station shall transmits reference signals through each of the multiple antennas, and the UE shall feedback the channel status for each of the channels from each of antennas. FIG. 6 is for the case when the base station having 4 antennas transmits reference signals ($R_0$, $R_1$, $R_2$ and $R_3$) to each of the antenna ports 0, 1, 2 and 3. As can be seen from FIG. 6, the reference signals for different antennas take different resource elements in the time-frequency resource. Thus, when the number of antennas severely increases, the reference signal overhead shall severely increases.

Figure 7:
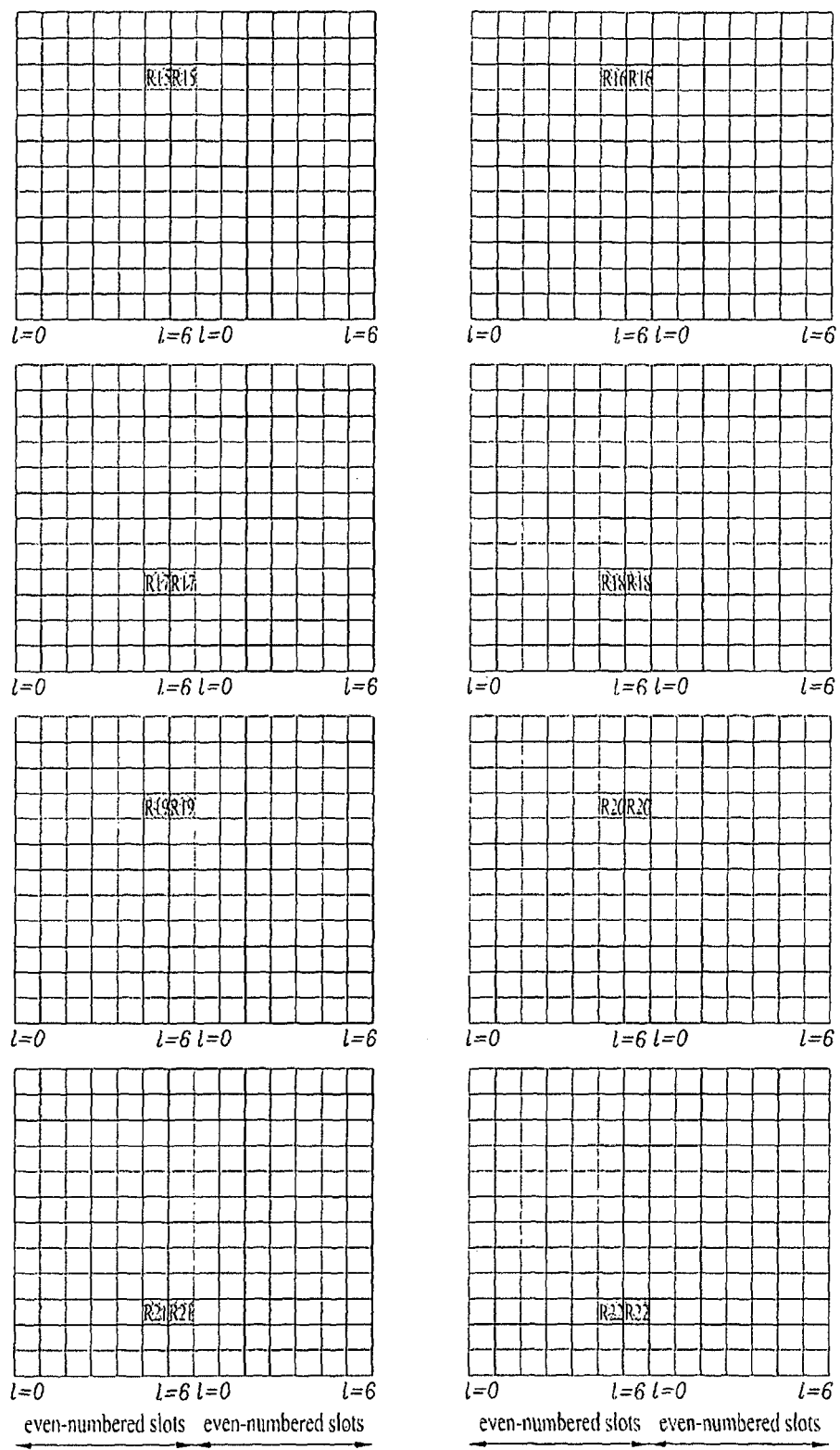
FIG. 7 shows a case when the base station having 8 antennas transmits CSI-RS for channel estimation.

FIG. 7 shows a case when the base station having 8 antennas transmits CSI-RS for channel estimation.

CSI-RS (Channel Status Information Reference Signal) is introduced to reduce the reference signal overhead. As can be seen from FIG. 7, the base station having 8 transmission antennas (antenna ports 15-22) may transmits the CSI-RSs via each of the antennas with reduced amount of resource when compared to the use of cell specific reference signal as shown by FIG. 6. Thus, one possible example of the present invention may use CSI-RS to estimate downlink channel, when the above explained massive MIMO is employed. However, in a preferred embodiment of the present application, the TDD scheme is employed and the uplink reference signal can be used to estimate downlink channel.

Figure 8:
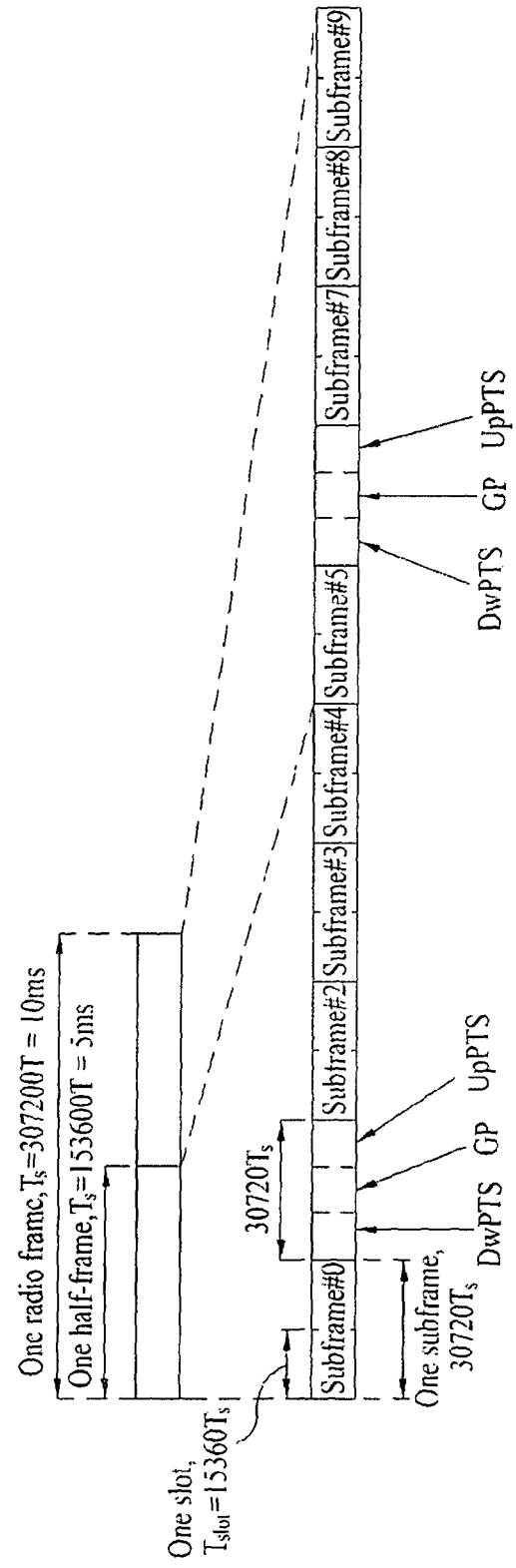
FIG. 8 shows a frame structure in a wireless communication system employing TDD scheme.

FIG. 8 shows a frame structure in a wireless communication system employing TDD scheme.

When FDD scheme is used, the downlink frequency band is different from the uplink frequency band. Thus, the estimation of the downlink channel is completely different from the estimation of the uplink channel. However, when the TDD scheme is used, the frequency band of the downlink channel is the same as that of uplink channel, thus we can use the uplink reference signal to estimate the downlink channel.

FIG. 8 is an example of the frame structure of one preferred embodiment of the present invention employing TDD scheme. Each radio frame of length $T_f = 307200 \cdot T_s = 10$ ms consists of two half-frames of length $153600 \cdot T_s = 5$ ms each. Each half-frame consists of five subframes of length $30720 \cdot T_s = 1$ ms. The supported uplink-downlink configurations are listed in [Table 1] where, for each subframe in a radio frame, "D" denotes the subframe is reserved for downlink transmissions, "U" denotes the subframe is reserved for uplink transmissions and "S" denotes a special subframe with the three fields DwPTS, GP and UpPTS. The length of DwPTS and UpPTS is given by [Table 2] subject to the total length of DwPTS, GP and UpPTS being equal to $30720 \cdot T_s = 1$ ms. Each subframe i is defined as two slots, 2i and 2i+1 of length $T_{slot} = 15360 \cdot T_s = 0.5$ ms in each subframe.

TABLE 1

| Uplink-downlink config-uration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

TABLE 2

| | | Normal cyclic prefix in downlink | | | Extended cyclic prefix in downlink | |
|---|---|---|---|---|---|---|
| | | | UpPTS | | | UpPTS |
| Special subframe configuration | DwPTS | Normal cyclic prefix in uplink | Extended cyclic prefix in uplink | DwPTS | Normal cyclic prefix in uplink | Extended cyclic prefix in uplink |
| 0 | $6592 \cdot T_s$ | $2192 \cdot T_s$ | $2560 \cdot T_s$ | $7680 \cdot T_s$ | $2192 \cdot T_s$ | $2560 \cdot T_s$ |
| 1 | $19760 \cdot T_s$ | | | $20480 \cdot T_s$ | | |
| 2 | $21952 \cdot T_s$ | | | $23040 \cdot T_s$ | | |
| 3 | $24144 \cdot T_s$ | | | $25600 \cdot T_s$ | | |
| 4 | $26336 \cdot T_s$ | | | $7680 \cdot T_s$ | $4384 \cdot T_s$ | $5120 \cdot T_s$ |
| 5 | $6592 \cdot T_s$ | $4384 \cdot T_s$ | $5120 \cdot T_s$ | $20480 \cdot T_s$ | | |
| 6 | $19760 \cdot T_s$ | | | $23040 \cdot T_s$ | | |
| 7 | $21952 \cdot T_s$ | | | $12800 \cdot T_s$ | | |
| 8 | $24144 \cdot T_s$ | | | — | — | — |
| 9 | $13168 \cdot T_s$ | | | — | — | — |

Uplink-downlink configurations with both 5 ms and 10 ms downlink-to-uplink switch-point periodicity are supported.

In case of 5 ms downlink-to-uplink switch-point periodicity, the special subframe exists in both half-frames.

In case of 10 ms downlink-to-uplink switch-point periodicity, the special subframe exists in the first half-frame only.

Subframes 0 and 5 and DwPTS are always reserved for downlink transmission. UpPTS and the subframe immediately following the special subframe are always reserved for uplink transmission.

In case multiple cells are aggregated, the UE may assume that the guard period of the special subframe in the different cells have an overlap of at least $1456 \cdot T_s$.

In case multiple cells with different uplink-downlink configurations are aggregated and the UE is not capable of simultaneous reception and transmission in the aggregated cells, the following constraints apply:

if the subframe in the primary cell is a downlink subframe, the UE shall not transmit any signal or channel on a secondary cell in the same subframe if the subframe in the primary cell is an uplink subframe, the UE is not expected to receive any downlink transmissions on a secondary cell in the same subframe if the subframe in the primary cell is a special subframe and the same subframe in a secondary cell is a downlink subframe, the UE is not expected to receive PDSCH/EPDCCH/PMCH/PRS transmissions in the secondary cell in the same subframe, and the UE is not expected to receive any other signals on the secondary cell in OFDM symbols that overlaps with the guard period or UpPTS in the primary cell.

By using the above explained frame structure for TDD scheme, the present embodiment may use the uplink reference signal to estimate the downlink channel. Further, the number of RSs does not have to increase when the number of antennas for one base station increase, and there is no need for the UEs to feedback the channel status information to the base station.

However, when the wireless communication system expends to multi-cell, the number of UEs shall increase, thus the number of orthogonal sequences for the uplink reference signals should increase to support it. But, there is a limit on the number of orthogonal sequences, thus when the number of orthogonal sequences is fewer than the number of UEs, there still may be the above explained pilot contamination problem.

To address this problem, one preferred embodiment of the present invention assumed UE grouping based reference signal transmission as explained below.

Figure 9:
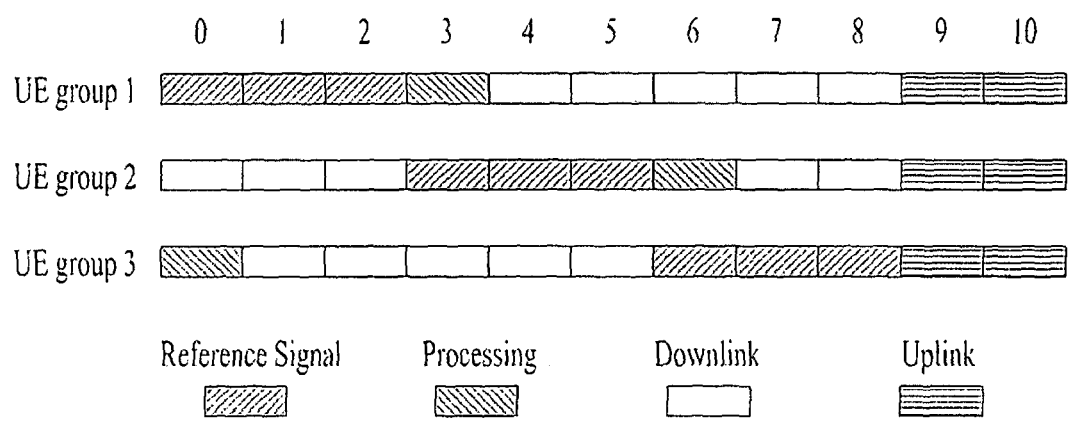
FIG. 9 shows UE grouping based reference signal transmission scheme according to one embodiment of the present invention.

FIG. 9 shows UE grouping based reference signal transmission scheme according to one embodiment of the present invention.

In this embodiment, the UEs in the wireless communication system may be grouped into multiple UE groups (e.g. UE group 1, UE group 2 and UE group 3 as shown in FIG. 9). UEs within the same UE group use orthogonal sequences for uplink reference signal orthogonal to each other. So, there is no pilot contamination problem for channel estimation.

Each UE group is synchronized with the base station with different timing. And, UEs of different UE groups may transmit uplink reference signals at different uplink transmission time units. For example, UE 1 of UE group 1 may transmits uplink sounding reference signal at subframes 0, 1 and 2 while UE 2 of UE group 2 receives downlink signal from the base station. The time units of FIG. 9 can be slot, subframe or equivalents. When the RS from UE 1 of UE group 1 is received by the base station, the base station may process it at subframe 4 while UE 2 of UE group 2 transmits uplink reference signals. When all the UE groups served by the base station (or base stations for Multi-BS operation) are synchronized with the base station(s), the UEs may transmits uplink data (e.g. from subframe 9 at FIG. 9).

The advantage of the above mentioned scheme will be explained.

Suppose there are two cells 'A' and 'B', and two UEs 'a' and 'b' within cells A and B, respectively. The channel $h_{mn}$ represents the channel between the $m^{th}$ base station and $n^{th}$ UE. The noise is not considered for convenience of explanation. In this case, when the base station A estimate the channel when the UEs a and b transmits SRS (sounding reference signal), the estimated channel can be expressed as $\hat{h}_{Aa} = \alpha_1 h_{Aa} + \alpha_2 h_{Ab} = \alpha_1 h_{Aa} + \alpha_2 h_{Ab}$. Here, $\alpha_1$ and $\alpha_2$ represent constant values. It can be said that the above estimated channel is contaminated by $\alpha_2 h_{Ab}$.

If the base station A receives data from UE a and UE b sending $\{d_a, d_b\}$, the result of MRC filter may be expressed as:

$$\frac{1}{N_t} \hat{h}_{Aa}^H (d_a h_{Aa} + d_b h_{Ab}) = \quad \text{[Equation 2]}$$

$$\frac{1}{N_t}(\alpha_1 h_{Aa}^H + \alpha_2 h_{Ab}^H)(d_a h_{Aa} + d_b h_{Ab}) =$$

$$\frac{\alpha_1 d_a}{N_t}\|h_{Aa}\|^2 + \frac{\alpha_2 d_b}{N_t}\|h_{Ab}\|^2 + \frac{\alpha_1 d_b}{N_t} h_{Aa}^H h_{Ab} +$$

$$\frac{\alpha_2 d_a}{N_t} h_{Ab}^H h_{Aa} \xrightarrow[N_t \to \infty]{} \frac{\alpha_1 d_a}{N_t}\|h_{Aa}\|^2 + \frac{\alpha_2 d_b}{N_t}\|h_{Ab}\|^2$$

In the above [equation 2], it can be recognized that the term $$\frac{\alpha_2 d_b}{N_t}\|h_{Ab}\|^2$$

does not arrive to 0 even when the number of antennas becomes infinite. So, there will be a performance degradation due to the pilot contamination.

However, when the above explained UE grouping based scheme is used, only one UE (e.g. UE a) transmit SRS while the other UE (e.g. UE b) does not transmit SRS. Suppose that the UE b receives data from the base station B while the UE a transmits SRS. In this case, the channel estimation at base station A can be expressed as:

$$\hat{h}_{Aa} = \alpha_1 h_{Aa} + \alpha_2 h_{AB} \quad \text{[Equation 3]}$$

It should be noted that the term $h_{Ab}$ is replaced by $h_{AB}$, since the base station B transmits data when the UE a transmits reference signal. If the base station A receives data from UE a and UE b sending $\{d_a, d_b\}$, the result of MRC filter may be expressed as:

$$\frac{1}{N_t} \hat{h}_{Aa}^H (d_a h_{Aa} + d_b h_{Ab}) = \quad \text{[Equation 4]}$$

$$\frac{1}{N_t}(\alpha_1 h_{Aa}^H + \alpha_2 h_{AB}^H)(d_a h_{Aa} + d_b h_{Ab}) =$$

$$\frac{\alpha_1 d_a}{N_t}\|h_{Aa}\|^2 + \frac{\alpha_2 d_a}{N_t} h_{AB}^H h_{Aa} + \frac{\alpha_1 d_b}{N_t} h_{Aa}^H h_{Ab} +$$

$$\frac{\alpha_2 d_b}{N_t} h_{AB}^H h_{Ab} \xrightarrow[N_t \to \infty]{} \frac{\alpha_1 d_a}{N_t}\|h_{Aa}\|^2$$

It should be noted that the interference become 0 when the number of antenna become infinite. So, by using the UE grouping based RS transmission scheme, the pilot contamination problem can be addressed while the number of orthogonal sequences is limited.

The above mentioned UE grouping based RS scheme can be more improved by the following scheme.

Figure 10:
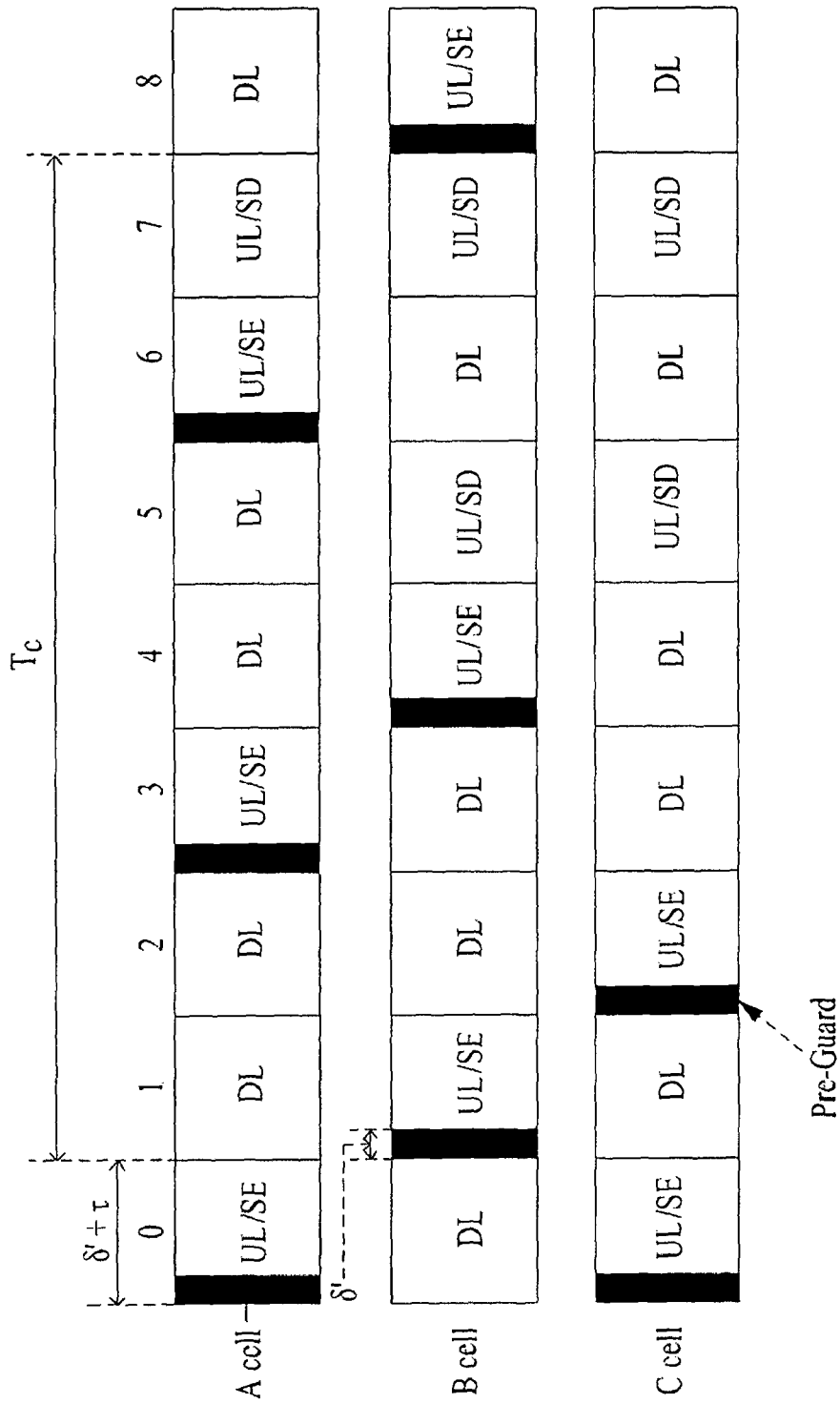
FIG. 10 is a diagram for explaining another preferred embodiment of the present application.

FIG. 10 is a diagram for explaining another preferred embodiment of the present application.

As explained above, the UE grouping based RS transmission may assign different uplink transmission time units to each of UE groups. In FIG. 10, it is assumed that each of UE groups corresponds to UEs within a cell. That is, UEs in cell A are grouped together as UE group A, UEs in cell B are grouped together as UE group B, and so on. Cells A, B and C may be cells among which the uplink reference signals can cause interference to each other. It can be referred to as co-located cells, but it can be referred to as other terms. Cells can be of one base station (e.g. p-cell and/or s-cells of an eNB), or of neighboring base stations. In FIG. 10, UEs in A cell may receives {100100110} in which '1' represents uplink transmission units (subframes) and '0' represents downlink reception units (subframes).

In the above example, 'cell' can correspond to a cell identified by physical cell ID, but it can also be a cell identified by virtual or logical cell ID. Also, it can be extended to cover a transmission point within the same cell. For example, a coverage of one antenna node of distributed antenna system can also be referred to as 'cell' of the above example.

According to one embodiment, the UEs receive information on which of uplink transmission time units is enabled to transmit an uplink reference signal. This information can be referred to as 'SRS-enabled' and 'SRS disabled', and can be commonly applied to the UEs in the same UE group (in the same cell). For example, the UEs in cell A of FIG. 10 may receive {1110}, where '1' represents 'SRS-enabled (SE)' and '0' represents 'SRS-disabled (SD)'. And, the UEs in cell B of FIG. 10 may receive {1100}, and the UEs in cell C of FIG. 10 may receive {1100}. In this example, it is assumed that the uplink transmission time units are differently predetermined to each of UE groups (cells), and the UEs had acquired this information (e.g. {100100110} for UEs in cell A) before or together with receiving the information on which of uplink transmission time units is enabled to transmit an uplink reference signal (e.g. {1110}). In FIG. 10, 'UL/SE' represents a time unit in which UEs in this UE group transmit SRS to the base station. 'UL/SD' represent a time unit in which UEs in this UE group does not transmits SRS, but transmits UL data. The above two type of information can be combined such that 2 bits represent 3 states of one subframe. For example, '00' may represent 'DL', '01' may represent 'UL/SE', and '10' may represents 'UL/SD'. This information can be signaled via PBCH or PDCCH common search space.

According to this embodiment, the UEs also receive information on a sequence used for the uplink reference signal from a base station. As stated above, the UEs transmitting SRS at the same time shall use orthogonal sequences to address the pilot contamination problem. So, this sequence allocation information prevents the use of non-orthogonal sequence at the same time unit.

In one example, an uplink transmission time for one UE group to transmit uplink SRS can be the same as that for another UE group to transmit uplink SRS. In FIG. 10, subframe 0 is designated as 'UL/SE' for cell A while it is designated as the same for cell C. This can be happened considering the number of available orthogonal sequences at specific time. And, this can be controlled by using the above information on the sequence used for the uplink reference signal from a base station.

According to one example of the present invention, the subframe designated as 'UL/SD' for one cell is not permitted when there is a subframe designated as 'UL/SE' for another cell. So, when there is a subframe designated as 'UL/SE' for one cell, only a subframe designated as 'UL/SE' and a subframe designated as 'DL" are permitted to other cells. This is to reduce the interference between uplink data of one cell and uplink reference signal of another cell.

According to another example of the present invention, the subframe designated as 'UL/SD' for one cell is permitted even when there is a subframe designated as 'UL/SE' for another cell. But, in this example, there is a need for means to prevent interference from uplink data of another cell.

It is also possible to make the above information on SE or SD to be signaled as UE-specific signaling. In another example of the present invention, the information on which of the uplink transmission time unit is for transmitting uplink reference signal may comprise a period for transmitting SRS and optionally an offset. It can be expressed as setting a threshold for specific UE and that UE counts the UL subframe. When the count reaches to the threshold value, the UE may transmit SRS at that subframe.

The above mentioned UE-specific signaling can be used together with UE group-specific information. For example, the UE group-specific information may indicates which of the subframes are candidates to be used to transmit SRS, and UE-specific information may indicates which of the candidates shall be used for it.

The above mentioned information on when to transmit SRS can be a form of triggering message. The base station(s) may consider the number of orthogonal sequence at specific time and the interference level caused by the UE's SRS to the downlink data to other UE in other UE group. In some case, the base station(s) may assign semi-orthogonal sequence to some UEs. By these considerations, the base station may transmit the triggering message to specific UEs at specific time units. This triggering message can be transmitted one or more subframes before the subframe in which the UE can transmit SRS to the base station. This message can be transmitted via PDCCH or any other control frame.

Preferably, the frame structure for the above mentioned embodiments comprises pre-guard period, as shown in FIG. 10. This pre-guard period is for preventing interference caused by transmission delay. During this pre-guard period, the UEs do not transmits SRS.

For example, when the UE of Cell A transmits SRS at subframe 0 and this SRS is delayed as much as δ, it may cause interference to the UE of Cell B. So, by making the UE of Cell B to transmit SRS after the pre-guard period of δ, the above mentioned interference can be prevented.

Figure 11:
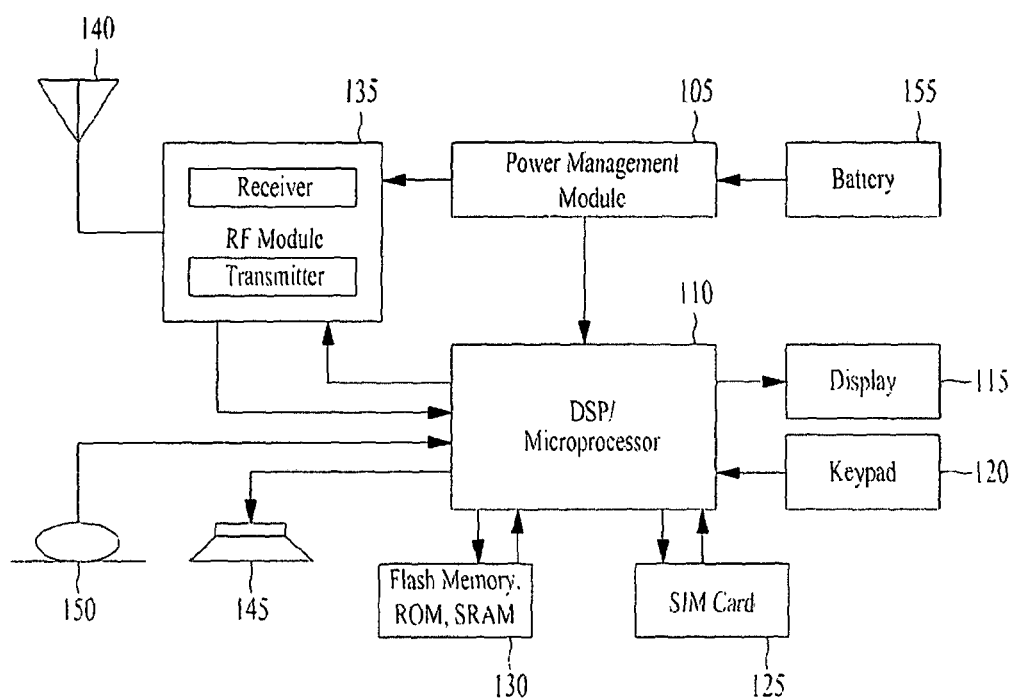
FIG. 11 is a block diagram of a communication apparatus according to an embodiment of the present invention.

FIG. 11 is a block diagram of a communication apparatus according to an embodiment of the present invention.

The apparatus shown in FIG. 11 can be a user equipment (UE) and/or eNB adapted to perform the above mechanism, but it can be any apparatus for performing the same operation.

As shown in FIG. 11, the apparatus may comprises a DSP/microprocessor (110) and RF module (transmiceiver; 135). The DSP/microprocessor (110) is electrically connected with the transceiver (135) and controls it. The apparatus may further include power management module (105), battery (155), display (115), keypad (120), SIM card (125), memory device (130), speaker (145) and input device (150), based on its implementation and designer's choice.

Specifically, FIG. 11 may represent a UE comprising a receiver (135) configured to receive first information on which of uplink transmission time units is enabled to transmit an uplink reference signal and second information on a sequence used for the uplink reference signal from a base station, a transmitter (135) configured to transmit the uplink reference signal to a base station at an uplink transmission time unit identified by the first information using the sequence identified by the second information, and a processor (110) connected to the receiver (135) and transmitter (135).

The above first information is differently determined to second UE group other than a first UE group including the first UE. And, the above mentioned second information is determined to assign orthogonal sequences to the UE groups.

Also, FIG. 11 may represent a base station operating in a wireless communication system employing a massive MIMO (Multiple Input Multiple Output) scheme. This base station comprises a transmitter (135) configured to transmit first information on which of uplink transmission time units is enabled to transmit an uplink reference signal and second information on a sequence used for the uplink reference signal to user equipments (UEs), wherein the first information is differently determined to second UE group other than a first UE group, wherein the second information is determined to assign orthogonal sequences to UEs of a same UE group; a receiver (135) configured to receive the uplink reference signal from the UEs at uplink transmission time units identified by the first information; and a processor (110) connected to the transmitter (135) and the receiver (135), and configured to estimate a channel using the sequence identified by the second information.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

INDUSTRIAL APPLICABILITY

While the above-described method has been described centering on an example applied to the 3GPP LTE system, the present invention is applicable to a variety of wireless communication systems in addition to the 3GPP LTE system.

The invention claimed is:

1. A method for a first user equipment (UE) to operate in a wireless communication system employing a massive Multiple Input Multiple Output (MIMO) scheme, the method comprising:
receiving first information identifying which uplink subframe of a plurality of subframes is enabled to transmit an uplink reference signal;
receiving second information identifying a sequence used for the uplink reference signal from a base station,
wherein the first information is used to identify a different uplink subframe to a first UE group including the first UE and a second UE group other than the first UE group, and
wherein the second information is determined to assign different orthogonal sequences to each of UEs of the first UE group; and transmitting the uplink reference signal to the base station at the uplink subframe identified by the first information using the sequence identified by the second information.

2. The method of claim 1, wherein the first UE transmits the uplink reference signal at an uplink subframe other than an uplink subframe in which a UE of the second UE group transmits the uplink reference signal.

3. The method of claim 1, further comprising:
receiving third information on when the first UE transmits the uplink reference signal within the uplink subframe identified by the first information.

4. The method of claim 3, wherein the third information comprises a period information and an offset information, and
wherein the third information is UE specific information.

5. The method of claim 3, wherein the third information comprises indication information explicitly indicating when the first UE transmits the uplink reference signal.

6. The method of claim 1, wherein the base station comprises multiple antennas, and
wherein a number of the multiple antennas is greater than a threshold number.

7. A method for a base station to operate in a wireless communication system employing a massive Multiple Input Multiple Output (MIMO) scheme, the method comprising:
transmitting first information identifying which uplink subframe of a plurality of subframes is enabled to transmit an uplink reference signal; and
transmitting second information identifying a sequence used for the uplink reference signal to user equipments (UEs),
wherein the first information is used to identify a different uplink subframe to a first UE group including a first UE and a second UE group other than the first UE group, and
wherein the second information is determined to assign different orthogonal sequences to each of UEs of a same UE group;
receiving the uplink reference signal from the UEs at the uplink subframe identified by the first information; and
estimating a channel using the sequence identified by the second information.

8. The method of claim 7, wherein the uplink reference signal is received from the first UE of the first UE group an uplink subframe other than an uplink subframe in which the second uplink reference signal is received from a second UE of the second UE group.

9. The method of claim 7, further comprising:
transmitting third information on when the first UE of the first UE group transmits the uplink reference signal within the uplink subframe identified by the first information.

10. The method of claim 9, wherein the third information comprises a period information and an offset information, and
wherein the third information is UE specific information.

11. The method of claim 9, wherein the third information comprises indication information explicitly indicating when the first UE transmits the uplink reference signal.

12. The method of claim 7, wherein the base station comprises multiple antennas, and
wherein a number of the multiple antennas is greater than a threshold number.

13. A user equipment (UE) operating as a first UE in a wireless communication system employing a massive Multiple Input Multiple Output (MIMO) scheme, the UE comprising:
a receiver configured to receive first information identifying which uplink subframe of a plurality of subframes is enabled to transmit an uplink reference signal and receive second information identifying a sequence used for the uplink reference signal from a base station,
wherein the first information is used to identify a different uplink subframe to a first UE group including the first UE and a second UE group other that the first UE group including the first UE, and
wherein the second information is determined to assign different orthogonal sequences to each of UEs of the first UE group;
a transmitter configured to transmit the uplink reference signal to the base station at the uplink subframe identified by the first information using the sequence identified by the second information; and
a processor connected to the receiver and the transmitter.

14. A base station operating in a wireless communication system employing a massive Multiple Input Multiple Output (MIMO) scheme, the base station comprising:
a transmitter configured to transmit first information identifying which uplink subframe of a plurality of subframes is enabled to transmit an uplink reference signal and transmit second information identifying a sequence used for the uplink reference signal to user equipments (UEs),
wherein the first information is used to identify a different uplink subframe to a first UE group including a first UE and a second UE group other than the first UE group, and
wherein the second information is determined to assign different orthogonal sequences to each of UEs of a same UE group;
a receiver configured to receive the uplink reference signal from the UEs at the uplink subframe identified by the first information; and
a processor connected to the transmitter and the receiver, and configured to estimate a channel using the sequence identified by the second information.

* * * * *